United States Patent [19]
Belon et al.

[11] Patent Number: 6,082,002
[45] Date of Patent: Jul. 4, 2000

[54] PRINTER DEVICE ROLLER WITH GRIT-BLASTED SURFACE, AND BEARING MOUNTING TECHNIQUE

[75] Inventors: Juan B. Belon; Ravi T. Singh, both of San Diego, Calif.

[73] Assignee: Hewlett-Packard Company, Palo Alto, Calif.

[21] Appl. No.: 09/211,191

[22] Filed: Dec. 14, 1998

Related U.S. Application Data

[62] Division of application No. 08/814,562, Mar. 11, 1997, Pat. No. 5,882,131.

[51] Int. Cl.[7] .................................................. B23P 15/00
[52] U.S. Cl. ........................ 29/895.3; 29/895.22; 492/47
[58] Field of Search ........................... 29/895.21, 895.22, 29/895.3, 898.07, 525; 492/47

[56] References Cited

U.S. PATENT DOCUMENTS

| | | | |
|---|---|---|---|
| 26,387 | 12/1859 | Vandeventer | 29/895.22 |
| 2,988,803 | 6/1961 | Mohn | 29/895.21 |
| 4,288,469 | 9/1981 | Meyer et al. | 427/560 |
| 4,458,399 | 7/1984 | Kessler | 29/895.21 |
| 5,152,618 | 10/1992 | Goodwin et al. | 400/641 |
| 5,340,166 | 8/1994 | Puttonen et al. | 285/189 |
| 5,433,308 | 7/1995 | Gagnon | 193/37 |
| 5,541,029 | 7/1996 | Iwata et al. | 430/45 |
| 5,552,235 | 9/1996 | Bastawros et al. | 428/687 |
| 5,675,893 | 10/1997 | Yamada et al. | 29/895.22 |
| 5,789,066 | 8/1998 | De Mare et al. | 428/156 |

OTHER PUBLICATIONS

European Search Report for Application 98301750.0, mailed Sep. 9, 1998.
Patent Abstracts of Japan, vol. 014, No. 247 (M–0978), May 25, 1990, & JP 02 067163 A (Matsushita Electric Ind Co Ltd), Mar. 7 1990.
EP 0 373 481 A (Eastman Kodak Co) Jun. 20, 1990.
Patent Abstracts of Japan, vol. 096, No. 0007, Jul. 31, 1996, & JP 08 083011 A (Akou Kogyosho:KK), Mar. 26, 1996.
Patent Abstracts of Japan, vol. 013, No. 060 (M–796), Feb. 10, 1989, & JP 63 265671 A (Cannon Inc), Nov. 2, 1988.

*Primary Examiner*—Irene Cuda

[57] ABSTRACT

A drive roller for an ink-jet printer. The drive roller has a media engaging surface that is roughened by grit blasting along an entire media engaging longitudinal peripheral extent. The surface is hardened by anodizing. The roller is relatively inexpensive to fabricate yet has a small error on diameter and run out, and high traction due to the surface roughness, to provide highly accurate media positioning performance. The drive roller rotates about shaft mounted bearings. The shaft journal is formed with a small raised bump, which has very loose diametrical tolerance requirements, but is short in comparison to the bearing length dimension. When the bearing is press fit onto the shaft journal, the material forming the raised bump is sheared by the bearing. The sheared material drops into a recess on the journal, and does not interfere with the axial positioning of the bearing. The axial position of the bearing is controlled by placing the bearing next to a shoulder formed on the shaft.

15 Claims, 8 Drawing Sheets

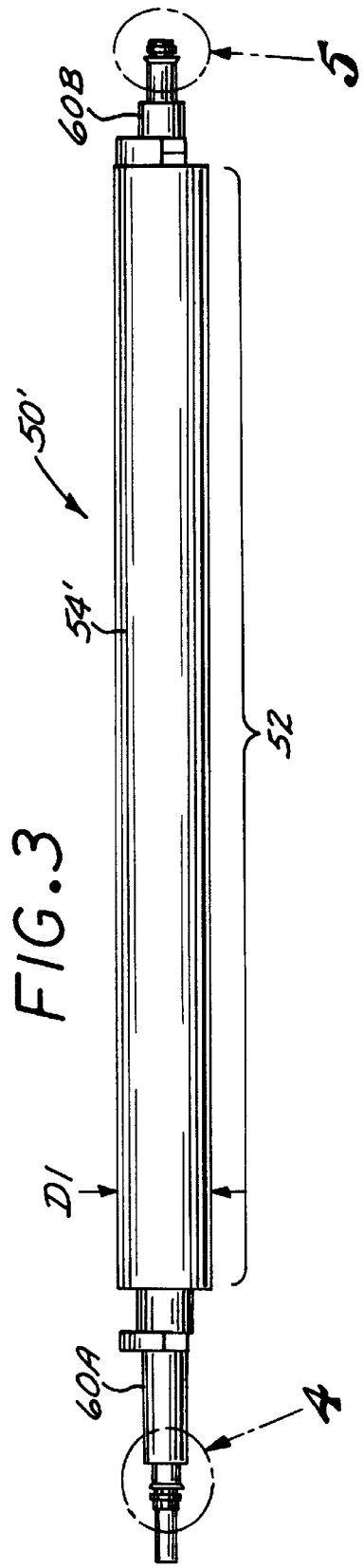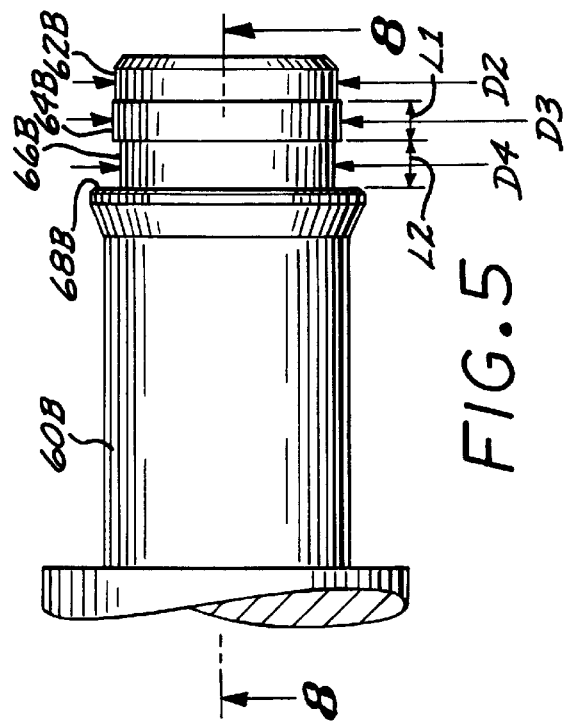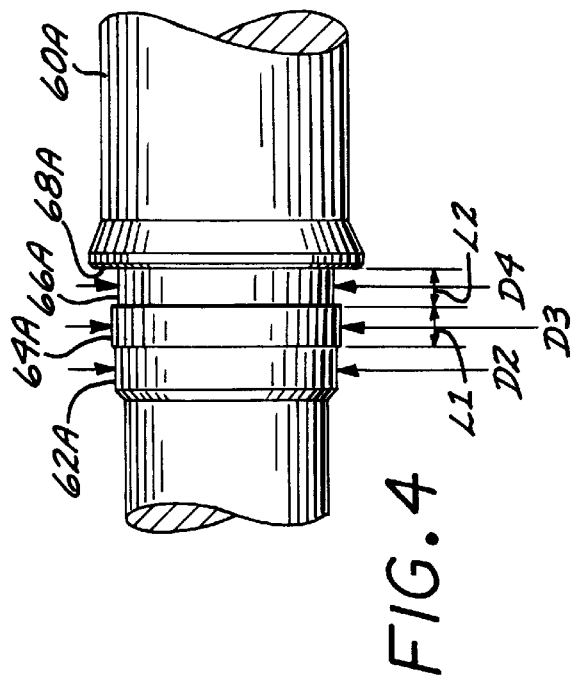

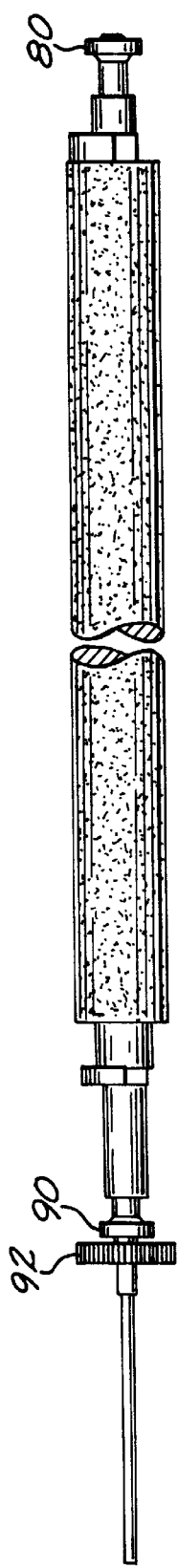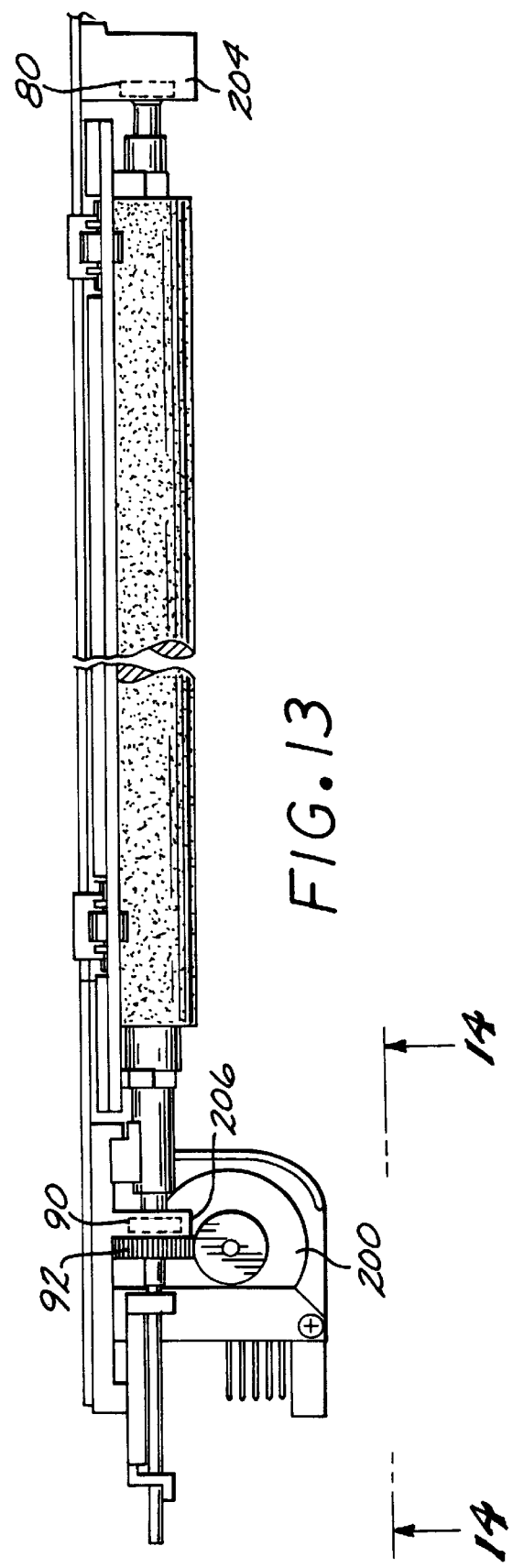
FIG.12
FIG.13

PRINTER DEVICE ROLLER WITH GRIT-BLASTED SURFACE, AND BEARING MOUNTING TECHNIQUE

CROSS REFERENCE TO RELATED APPLICATION

This is a divisional of copending application Ser. No. 08/814,562 filed on Mar. 11, 1997, Pat. No. 5,882,131.

TECHNICAL FIELD OF THE INVENTION

This invention relates to ink-jet printers with paper advancing mechanisms, and more particularly to an improved drive roller for low-cost ink-jet printers

BACKGROUND OF THE INVENTION

Grit rollers have been employed to provide a gripping surface on printer drive rollers to advance the paper through the paper path and prevent slippage of the paper. These rollers have a rough surface defined by grit adhered to a surface, can have a relatively small diameter, and work well for the intended purpose. Grit rollers are relatively expensive, and would unduly add to the cost of low cost, high volume printers.

Rubber surfaced rollers have also been used as drive rollers for printers, and are relatively inexpensive, but are not as accurate as grit rollers, and also have the disadvantage of relatively large diameter error, requiring a larger roller diameter to compensate for the lack of tolerances.

Another problem of drive rollers is that of attachment of the bearings for the drive rollers. Bearings are expensive, and attachment to the drive rollers can lead to damage.

It would therefore be advantageous to provide a drive roller for a printer which is accurate and with relatively diameter error, and is relatively inexpensive to build.

It would further be advantageous to provide an inexpensive technique for attaching the bearings to the drive roller in such a way as to avoid the need for high tolerances.

SUMMARY OF THE INVENTION

A drive roller for an ink-jet printer is described which overcomes the foregoing limitations. The drive roller has a media engaging surface that is roughened by grit blasting along an entire media engaging longitudinal peripheral extent. The surface is hardened by anodizing. The roller is relatively inexpensive to fabricate yet has a small diameter error and high traction to provide highly accurate media positioning performance. The drive roller rotates about shaft mounted bearings. The shaft journal is formed with a small raised bump, which has very loose diametrical tolerance requirements, but is short in comparison to the bearing length dimension. When the bearing is press fit onto the shaft journal, the material forming the raised bump is sheared by the bearing. The sheared material drops into a recess on the journal, and does not interfere with the axial positioning of the bearing. The axial position of the bearing is controlled by placing the bearing next to a shoulder formed on the shaft.

BRIEF DESCRIPTION OF THE DRAWING

These and other features and advantages of the present invention will become more apparent from the following detailed description of an exemplary embodiment thereof, as illustrated in the accompanying drawings, in which:

FIG. 3 is a front view of a drive roller in a preliminary state of fabrication in accordance with the invention.

FIGS. 4 and 5 illustrate the respective left and right roller shaft journals of the unfinished roller in enlarged view.

FIG. 12 is a front view of the finished drive roller part.

FIG. 13 is a front view of the finished drive roller after installation in a media drive system of the printer of FIG. 1.

DETAILED DESCRIPTION OF THE PREFERRED EMBODIMENT

This invention relates to a drive roller used in the paper path of a printer used for making hard copies. In an exemplary embodiment, the printer is an ink-jet printer employing a traversing carriage holding one or more ink-jet print cartridges. A carriage scanning mechanism scans the carriage along a carriage scan axis generally transverse to the media path through the machine. A paper advancing apparatus is employed for advancing the media from an input tray through the print zone. The drive roller according to the present invention is used in the paper advancing apparatus.

Figure 1:
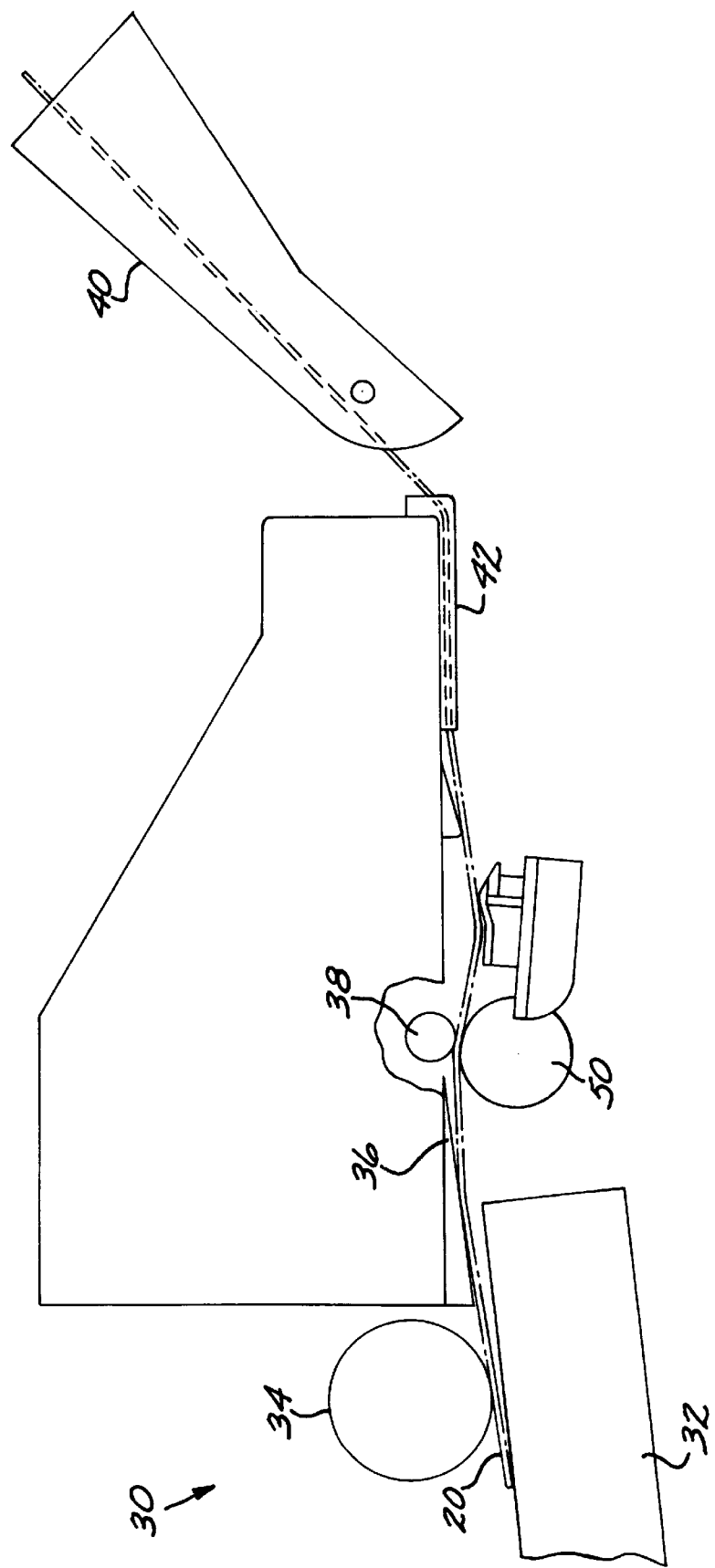
FIG. 1 shows in simplified side view an exemplary printer 30 using a drive roller in accordance with this invention.

FIG. 1 shows in simplified side view an exemplary printer 30 using a drive roller in accordance with this invention. The printer includes an input paper tray for holding a supply of paper or other media in sheet form. Upon command by the printer controller, a pick roller 34 engages the top sheet 20 of media in the tray 32, and advances it past a page guide 36 into the nip between a drive roller 50 and a pinch roller 38. In this exemplary embodiment, the printer 30 also includes a single sheet feed path, wherein a single sheet of paper or other media can be fed manually on door assembly 40, along lower shim 42 and into the nip between the drive roller and pinch roller. The drive roller 50 is motor-driven, and its direction of rotation can be reversed to the counter-clockwise direction if a single sheet is fed from the door assembly 40.

It is to be understood that the particular details of the printer 30 are merely illustrative, and that the drive roller of this invention has utility in other types of printers and paper handling apparatus.

Figure 2:
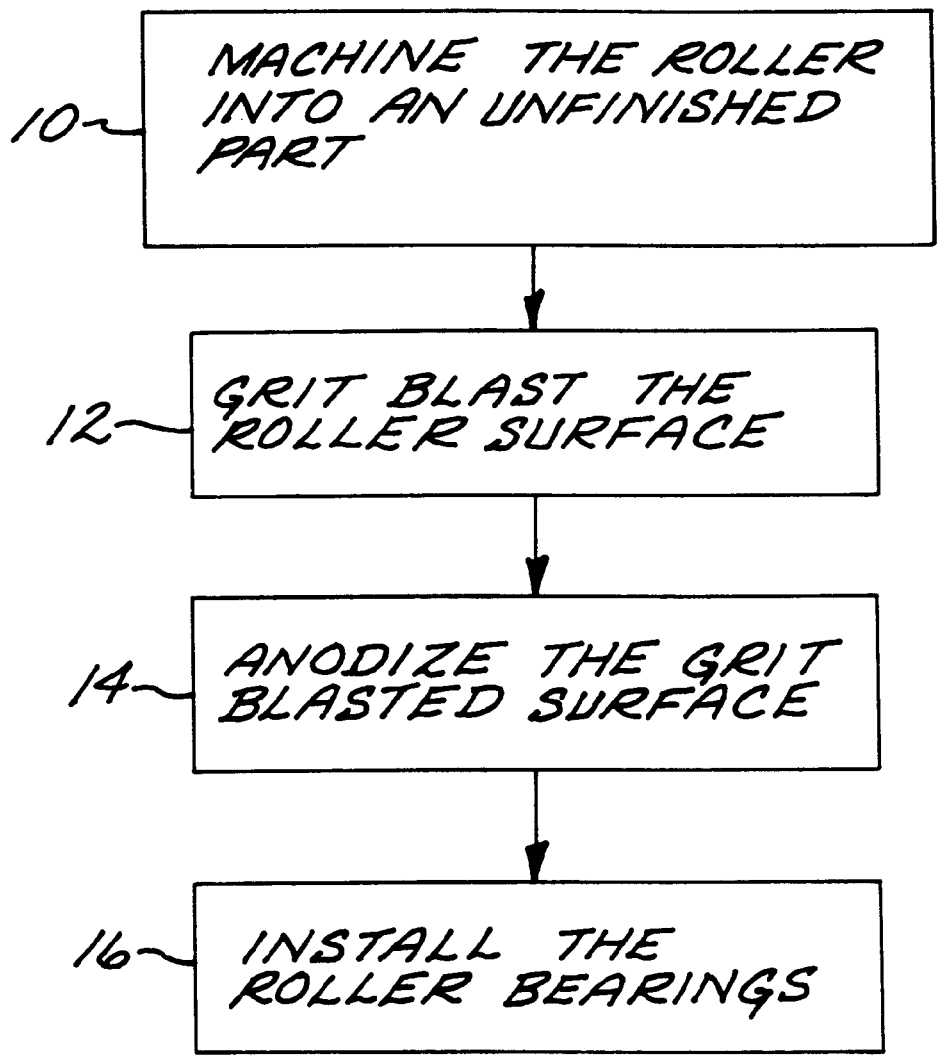
FIG. 2 is a simplified flow diagram showing exemplary steps in the fabrication of a drive roller in accordance with the invention.

FIG. 2 is a simplified flow diagram illustrating exemplary steps in the fabrication of a drive roller in accordance with this invention. The initial step 10 in this exemplary method is to machine a solid rod of aluminum into an unfinished form of the drive roller with a circumferential surface. Next, at step 12, the surface of the unfinished part is grit blasted to form a roughened media engaging surface. The surface is then anodized at step 14 to harden the roughened surface. The roller bearings are then installed at step 16.

FIG. 3 is a front view of a drive roller in a preliminary state of fabrication. The roller in this preliminary state shall be referred to as unfinished roller 50'. The unfinished roller has a substantial longitudinal extent portion, indicated by reference 52, which comes into contact with the print media. The roller 50 is machined from solid aluminum, and has a circular cross-section along the longitudinal extent portion 52 with a nominal diameter dimension D1 of 0.679 inch, in this exemplary embodiment. The longitudinal extent portion 52 of the unfinished roller 50' has a generally smooth surface indicated generally as surface 54', due to the machining process. However, in accordance with the invention, the surface 54' is processed by grit blasting to present a roughened surface with a nominal 400 microinches Ra, where Ra is the arithmetical mean deviation of the surface profile, i.e. the arithmetic mean of the absolute values of the profile deviations from the mean line. Other Ra surface roughnesses will also produce satisfactory traction results. Preferably, the surface profile will be in the range of 350 microinches to 700 microinches Ra. This is rough enough to hold the media without slippage, and at the same time is not so rough as to permanently mark the paper. The roller is then anodized so that it will not rust, and to harden the grit blasted surface so that it will have sufficient hardness to last the life of the printer.

Figure 6:
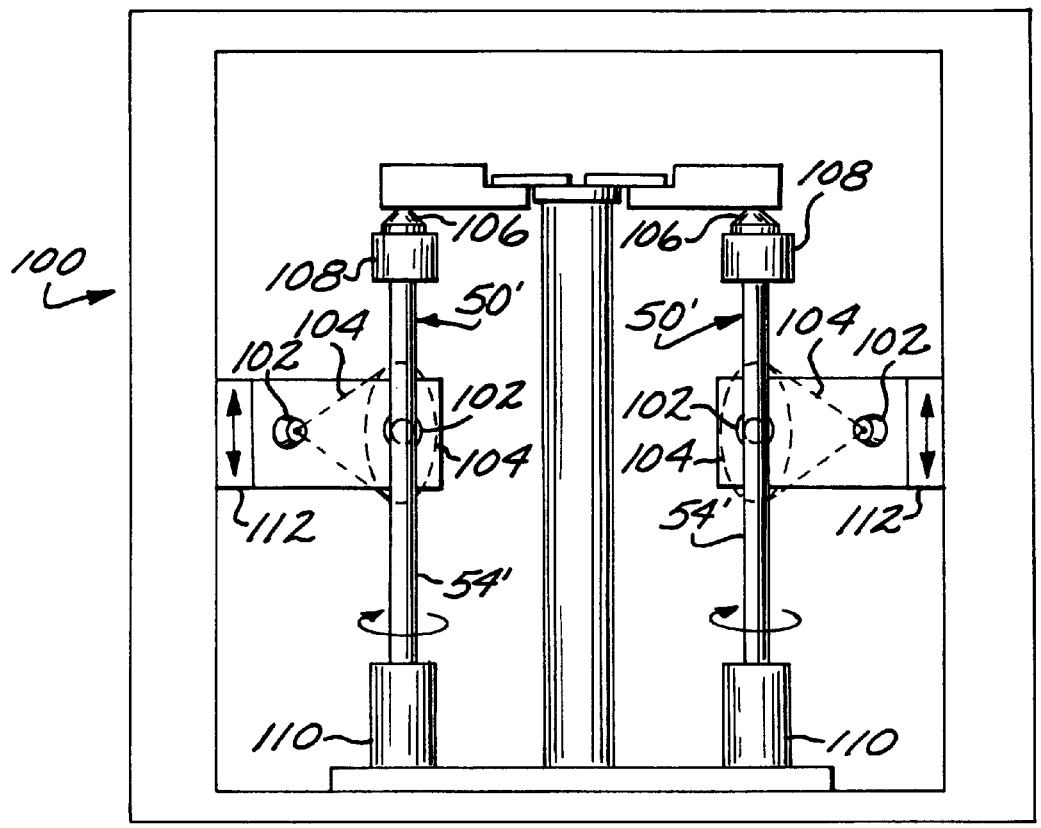
FIG. 6 illustrates an exemplary grit blasting apparatus 100 suitable for grit blasting the aluminum drive roller surface.

FIG. 6 illustrates an exemplary grit blasting apparatus 100 suitable for grit blasting the aluminum drive roller surface. In this case, the apparatus 100 includes a plurality of grit blasting nozzles 102 connected to a source of air pressure and aluminum oxide particles for directing a stream of particles in a spray pattern 104 onto the surface 54' of the roller. The system includes turning fixtures 106 for turning the rollers during the blasting process to present fresh surface areas to the spray nozzles. The fixtures include housings 108 and 110 which protect the ends of the rollers 50' outboard of the surface 54' from the grit blasting. In an exemplary embodiment, there are four nozzles 102 carried by fixture 112 arranged on a semicircle at 60 degree spacings, on a plane transverse to the roller axis when mounted in the apparatus 100, with the roller at the center of the semicircle, its surface spaced about 6 inches from the nozzles. The fixture 112 is moved along an axis parallel to the roller axis, to pass the nozzle array along the longitudinal extent of the roller surface to be grit blasted. In an exemplary embodiment, the roller is rotated at 30 RPM, plus or minus 1 RPM, and the nozzle array is moved from one end of the roller surface to the other end at a rate of 0.41 inches per second, plus or minus 0.1 inches per second. The aluminum oxide particle size for this exemplary embodiment is #16, and the nozzle pressure is 70–90 psi. The blasting process can be performed under computer control to obtain a uniform surface roughness on the surface 54'.

After the surface 54' is grit blasted to obtain the desired surface roughness, the surface 54' is anodized to harden the surface. In this exemplary embodiment, the surface is anodized to a depth between 7.6 and 10.1 microinches, using a Type II, clear, Class One anodizing process.

Figure 7:
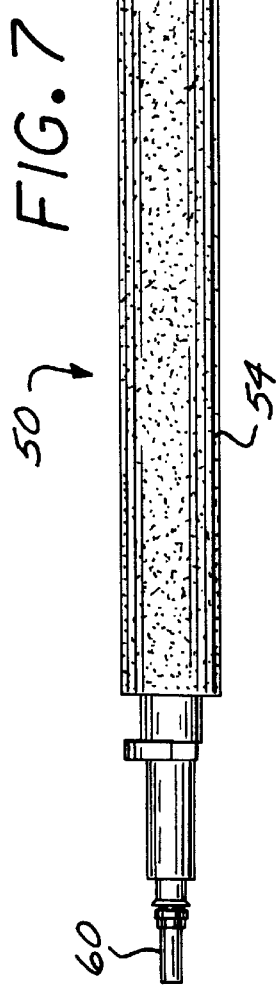
FIG. 7 is a front view of the drive roller in a finished form, prior to installation of the bearings.

After anodizing is completed, the roller 54' has been finished to provide a finished roller part, indicated in FIG. 7 as element 50, with a roughened surface 54. The external roughened surface 54 is an integral part of the roller 50, without the need for adhesives or other forms of adhering particles to a surface to provide the roughness desired for gripping the paper. The roller has been fabricated from a single rod of aluminum stock. The advantages of the roller 50 in accordance with the invention are its relatively low cost and its accuracy. The accuracy is achieved because of the relative high tolerances on the roller diameter and the hardness of the aluminum in relation to that of a rubber/elastomeric coating for the roller. The hardness results in a constant diameter even when the roller is loaded with force.

The shaft 60 of the roller 50 is mounted on small bearings 80, 90 for mounting in the roller drive apparatus of the printer 30, as shown in FIGS. 12 and 13. These small bearings need high tolerances, e.g. on the order of 0.0003 inches on the diameter of the shaft journal to prevent damage in the bearing mounting process. To machine the shaft to such high tolerances is expensive. A new technique of mounting the bearings on the shaft journal is provided, in accordance with a further aspect of this invention.

FIGS. 4 and 5 illustrate the respective roller shaft journals of the unfinished roller 50' in enlarged view. FIG. 3 shows the left shaft portion 60A, with journal portions 62A, 64A and 66A. The shaft and journal portions are all formed integrally from machining a solid rod of aluminum. However, in accordance with this aspect of the invention, the journal portions 62A, 64A and 66A have diametrical dimensions D2, D3 and D4, wherein D3 is slightly larger than D2, and D2 is slightly larger than D4. In an exemplary embodiment, nominal dimensions for D2, D3 and D4 are 0.197 inch, 0.198 inch and 0.176 inch. Journal portion 64A therefor defines a raised mass or bump of aluminum. A shoulder 68A is defined at the inner edge of journal portion 66A.

In a similar fashion, the right shaft portion 60B is shown in FIG. 5, with journal portions 62B, 64B and 66B, again having respective diametrical dimensions D2, D3 and D4 and with shoulder 68B.

The journal portions 64A and 64B have a length L1. The journal portions 66A and 66B have a length L2. In this exemplary embodiment, L1 is 0.035 inch, and L2 is 0.032 inches. These lengths are related to the thickness of the bearing to be press fit into place, as illustrated in detail in FIGS. 8–11, which illustrate sequential positions of a bearing 80 as it is being press fit onto the right shaft journal.

Figure 9:
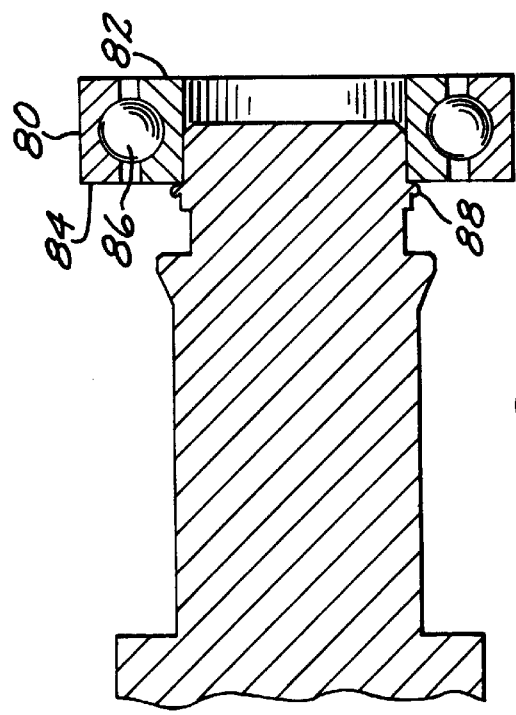
FIGS. 9–11 are cross-sectional views similar to FIG. 7, showing further progressive positions of the bearing during the course of the press fitting process.
Figure 8:
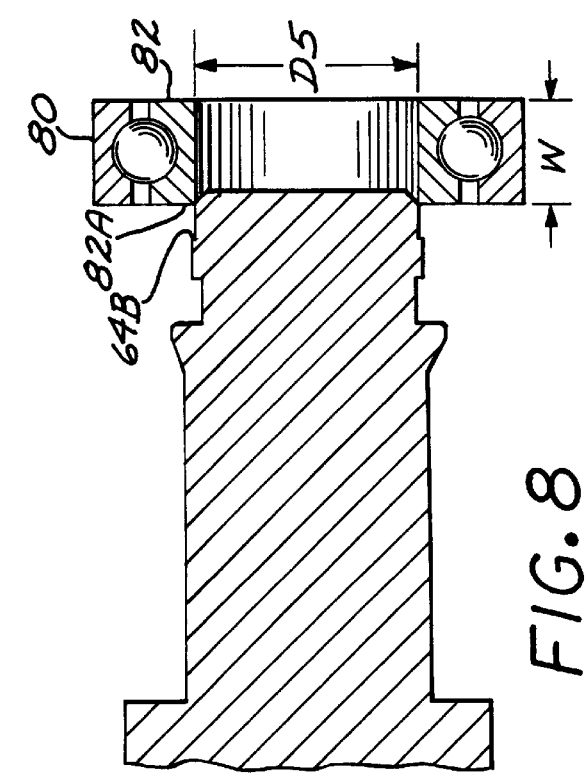
FIG. 8 is a partial cross-sectional view of the end of the drive roller shaft, taken along line 8—8 of FIG. 7, and showing a bearing in a first position of a press fitting process.
Figure 10:
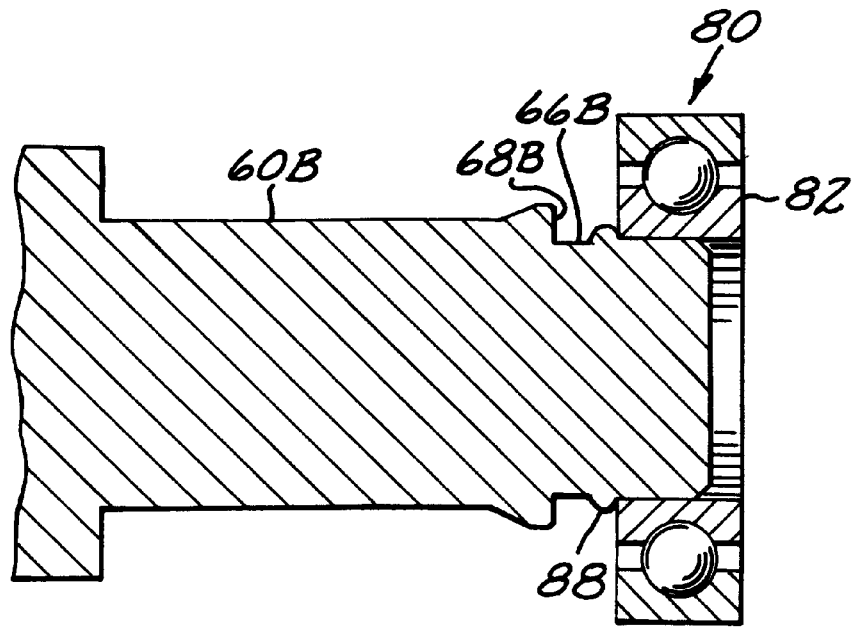
Figure 11:
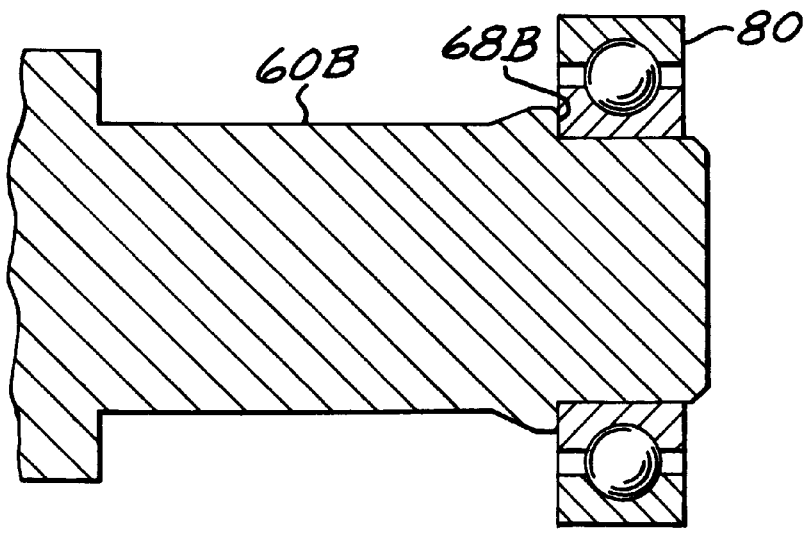

The bearing 80 includes an inner race member 82, and outer race member 84, and a plurality of ball bearings 86 which ride in the race between the inner and outer race members. The inner race member 82 has an inner diameter D5, and a width dimension W. In this exemplary embodiment, the dimension D5 is 0.1969 inch, and the dimension W is 0.098 inch. Note that W is larger than L1 and L2. The dimension D2, i.e. the diameter of the journal portion 62B is nominally slightly smaller than the bearing inner diameter D5, and so the bearing 80 can readily be pressed onto the shaft journal portion 62B, as shown in FIG. 8. As the bearing moves onto the journal, however, the face 82A of the inner race member 82 comes into contact with the raised bump defined by journal portion 64B. As pressure is exerted by the press tool, the relatively hard steel race member 82 shears the relatively soft aluminum defining the raised bump, as shown in FIG. 9, shearing a mass of material 88. As the bearing is pressed onto the journal, the mass of material 88 is pushed into the journal shaft recess defined by the journal portion 66B, with a diameter smaller than the portion 64B, as shown in FIGS. 10 and 11, until the bearing face 82 comes into contact with shoulder 68B. At this point, the axial position of the bearing on the shaft is precisely registered. Moreover, the bearing is tightly fitted onto the shaft, with only a low tolerance initial fit. It will be seen that the length L1 of the raised bump is substantially less than the width dimension of the bearing, leaving sufficient volume in the recess formed by journal portion 66B to accept the sheared material 88.

A similar press fit process is used to press fit the bearing 90 onto the left shaft journal. The result is illustrated in FIG. 12, which shows both bearings 80 and 90 in place adjacent the shaft ends. A drive gear 92 is also press fit onto the left end of the shaft, as shown in FIG. 13. The drive roller can then be assembled into the chassis and drive apparatus of the printer.

Figure 14:
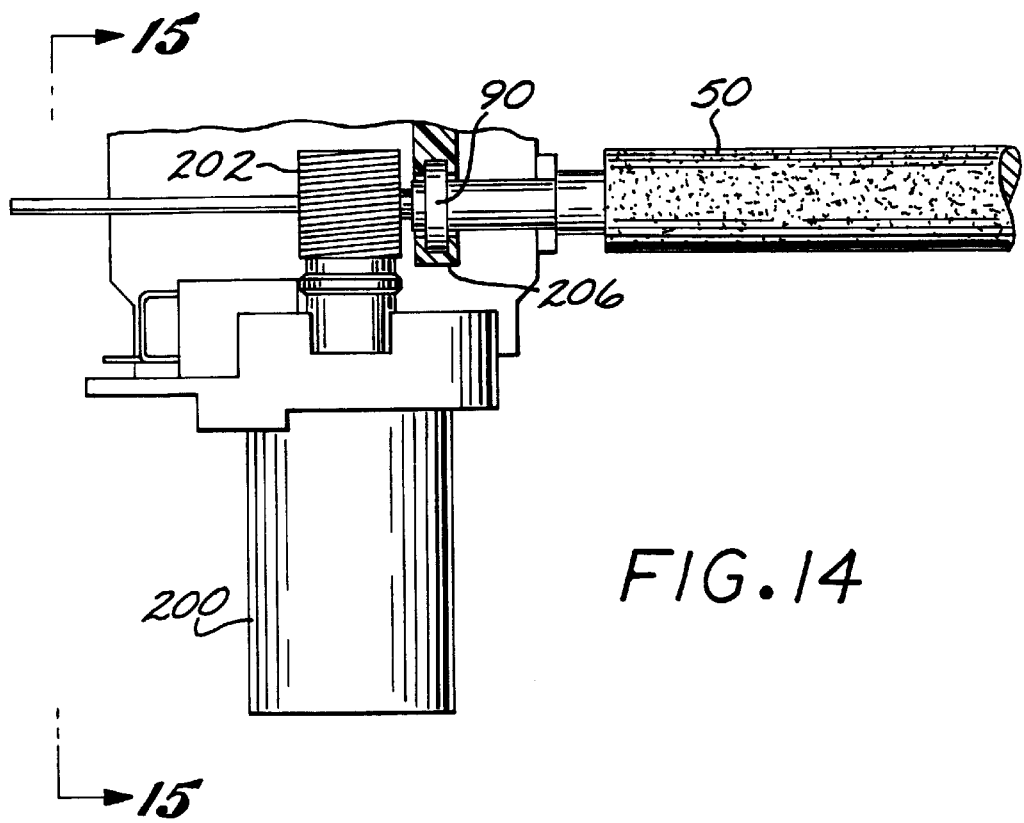
FIG. 14 is a partial bottom view of the media drive system illustrated in FIG. 13.
Figure 15:
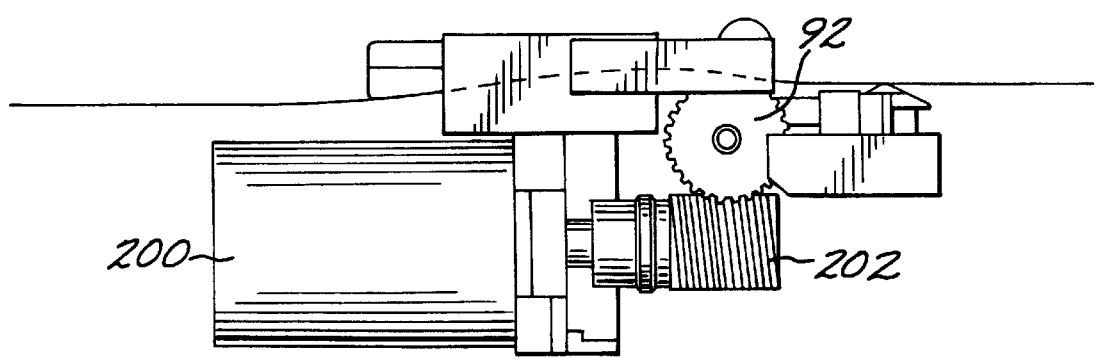
FIG. 15 is a side view of the media drive system of FIG. 13.

FIGS. 13–15 illustrate an exemplary printer media drive apparatus for driving the roller 50. The shaft bearings 80 and 90 are fitted to bearing receptacle structures 204 and 206, which secure the roller in position. A stepper motor 200 has a worm roller gear 202 fitted on its shaft. The gear 202 engages the gear 92 mounted at the roller shaft, and thus allows the stepper motor to rotationally drive the roller 50. It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method of installing a circumferential bearing onto a shaft journal of a printer drive roller, comprising the following steps:

providing a drive roller having a shaft journal including a first journal portion having a first diameter and a first axial length dimension, the shaft journal further including a second journal portion adjacent said first portion and having a second diameter and a second axial length dimension, said first diameter larger than said second diameter;

providing a bearing having an inner bearing structure with a circumferential opening therein, the opening having a third diameter which is smaller than said first diameter and larger than said second diameter, the bearing having a third axial length dimension which is larger than said first axial dimension and said second axial dimension;

pressing the bearing onto the shaft journal by first pressing the bearing onto the first bearing and shearing a top mass of material forming said first journal portion, and subsequently continuing to press the bearing onto the shaft journal second portion while permitting the sheared top mass of material to lodge on a surface of said second journal portion.

2. The method of claim 1 wherein said shaft further includes a shoulder defined adjacent said second journal portion and inboard of said first portion, and wherein said during said step of pressing the bearing onto the shaft journal, an axial position of the installed bearing is registered by the bearing coming into contact with the shoulder.

3. The method of claim 1, wherein the shaft journal further comprises a third portion disposed outboard of said first portion, said third portion having a fourth diameter dimension which is smaller than said first diameter dimension, and wherein said bearing inner member is initially pressed onto said third portion prior to engaging said first portion.

4. A method for fabricating a metal drive roller for a printer, comprising:

providing a metal drive roller having a circumferential metal media engaging surface, wherein the roller is a unitary structure fabricated of a solid metal rod, said media engaging surface defined on an outer surface of the solid metal rod, said metal drive roller further having left and right sets of shaft journal portions extending at left and right ends of the roller as a unitary part of said solid metal rod;

grit blasting the media engaging surface of the roller to roughen the surface, so that said media engaging surface has a surface profile in the range of 350 microinch Ra to 700 microinch Ra; and press fitting respective left and right bearings into engagement on said left and right sets of shaft journal portions.

5. The method of claim 4 further comprising the step of anodizing the media engaging roughened surface to harden the surface.

6. The method of claim 4 wherein said step of grit blasting the surface of the roller results in a surface profile of about 400 microinch Ra.

7. The method of claim 4 wherein said step of grit blasting the surface includes grit blasting with particles of aluminum oxide.

8. The method of claim 4 further including the step of installing a drive gear onto an end of said drive roller.

9. The method of claim 8 wherein the step of installing a drive gear includes press fitting the drive gear onto said end of the drive roller.

10. The method of claim 4 wherein said solid metal rod is an aluminum rod.

11. The method of claim 4 wherein said media engaging surface is free of any non-metallic coating.

12. A method of constructing a drive roller for a printer, comprising the steps of:

providing a cylindrical shaft having a pair of journal ends, each journal end including an inner shoulder, an intermediate recess and an outer bump for facilitating the receiving and registering of a respective one of said bearing member thereon;

providing a pair of bearing members, each bearing member having a plurality of bearings movably mounted between an inner race member and an outer race member, the inner race having an inner diameter sufficiently large to permit the bearing member to be partially received on either journal end of the shaft, but not sufficiently large to pass the outer bump and into registered engagement with the inner shoulder of the shaft; and pressing the respective bearings onto corresponding ones of the journal ends, the inner race member being sufficiently hard to shear the bump as the bearing member is pressed axially inwardly under force onto the shaft and into registration with the shoulder of the shaft, the recess being sufficiently deep to receive the sheared bump so it will not interfere with the axial position of the bearing member on the shaft.

13. The method of claim 12 wherein said step of providing said shaft is further characterized in that said left and right bearing portions have diametrical dimensions which are smaller than a diametrical dimension of said circumferential metal media engaging surface.

14. The method of claim 12 further including the step of installing a drive gear onto an end of said drive roller.

15. The method of claim 14 wherein the step of installing a drive gear includes press fitting the drive gear onto said end of the drive roller.

* * * * *